United States Patent
Furuyama

(10) Patent No.: US 7,697,379 B2
(45) Date of Patent: Apr. 13, 2010

(54) INFORMATION PROCESSING APPARATUS AND ITS CONTROL METHOD, PROGRAM, AND STORAGE MEDIUM

(75) Inventor: Hiroaki Furuyama, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 11/414,446

(22) Filed: Apr. 28, 2006

(65) Prior Publication Data

US 2006/0193211 A1    Aug. 31, 2006

Related U.S. Application Data

(63) Continuation of application No. PCT/JP2005/018248, filed on Sep. 27, 2005.

(30) Foreign Application Priority Data

Sep. 28, 2004 (JP) ............................. 2004-282346
Nov. 10, 2004 (JP) ............................. 2004-326460

(51) Int. Cl.
*G11B 21/08* (2006.01)

(52) U.S. Cl. .................................. 369/30.36

(58) Field of Classification Search .............. 369/30.32, 369/30.36
See application file for complete search history.

(56) References Cited

U.S. PATENT DOCUMENTS

| | | | | |
|---|---|---|---|---|
| 6,661,763 | B2* | 12/2003 | Kurashina et al. | 369/59.25 |
| 7,054,540 | B2* | 5/2006 | Nomura et al. | 386/52 |
| 7,236,436 | B2* | 6/2007 | Hayashi | 369/47.33 |
| 7,362,682 | B2* | 4/2008 | Shingai et al. | 369/59.1 |
| 2001/0005343 | A1* | 6/2001 | Shoji et al. | 369/47.51 |
| 2003/0227847 | A1 | 12/2003 | Minabe et al. | 369/53.27 |
| 2004/0117576 | A1* | 6/2004 | Kobayashi et al. | 711/163 |
| 2004/0228264 | A1* | 11/2004 | Shimada et al. | 369/292 |
| 2005/0068878 | A1* | 3/2005 | Itoh et al. | 369/84 |
| 2006/0028936 | A1* | 2/2006 | Ninomiya et al. | 369/47.1 |
| 2006/0031201 | A1* | 2/2006 | Adams et al. | 707/3 |

FOREIGN PATENT DOCUMENTS

| | | |
|---|---|---|
| JP | 63-186318 A | 8/1988 |
| JP | H07-287919 | 10/1995 |
| JP | 08-153040 | 6/1996 |
| JP | H09-035409 | 2/1997 |
| JP | 2003-022536 | 1/2003 |
| JP | 2003-037603 A | 2/2003 |
| JP | 2003-317389 | 11/2003 |
| JP | 2004-015098 A | 1/2004 |

OTHER PUBLICATIONS

The above references were cited in a Dec. 11, 2009 Japanese Office Action, a copy of which is enclosed without English Translation, that issued in Japanese Patent Application No. 2004-326460.

* cited by examiner

*Primary Examiner*—Wayne R Young
*Assistant Examiner*—Brenda Bernardi
(74) *Attorney, Agent, or Firm*—Cowan, Liebowitz & Latman, P.C.

(57) ABSTRACT

When a disk unloading operation is made by mistake or when recording is suddenly required after the unloading operation in a conventional disk recording/playback apparatus which has no cancel function of the disk unloading operation, an important recording chance is often missed. This invention allows the user to cancel the disk unloading operation, and can quickly restore the state before the disk unloading operation, thus solving the above problem.

8 Claims, 14 Drawing Sheets

INFORMATION PROCESSING APPARATUS AND ITS CONTROL METHOD, PROGRAM, AND STORAGE MEDIUM

CROSS-REFERENCE TO RELATED APPLICATIONS

This application is a continuation of International Application No. PCT/JP2005/018248, filed Sep. 27, 2005, the entire disclosure of which is hereby incorporated by reference.

TECHNICAL FIELD

The present invention relates to a technique for recording and/or playing back information data on/from a detachable disk recording medium.

BACKGROUND ART

Conventionally, a disk recorder for recording image data on a disk medium such as an optical disk or the like is known (see Japanese Patent Laid-Open Nos. 8-153040 and 2003-317389 (US Publication Number: US-2003-0227847)). An apparatus of this type records/plays back data using management information that manages recorded data on a disk. Normally, the apparatus stores management information, which is read out from a disk upon loading that disk, in a main body memory, updates the management information on the memory in correspondence with the recording/playback operation, and writes back the updated management information on the disk upon unloading the disk.

In recent years, a disk video camera which records/plays back sensed image data on/from a disk medium has appeared.

The aforementioned disk video camera normally must write date information and the like on a disk in addition to the management information upon unloading the disk. Upon loading the disk, the disk video camera must execute laser calibration of an optical pickup, free space detection, and the like in addition to the read processing of the management information.

Since these operations take as long as several ten seconds, if the user inadvertently unloads the disk or wants to record immediately after unloading, a considerable time is required until the disk video camera becomes ready to record, thus missing an important recording chance.

DISCLOSURE OF INVENTION

The present invention has been made in consideration of the above problems, and has as its object to quickly recover a recordable state even when a disk is inadvertently unloaded.

In order to solve the above problems and to achieve the object, according to the first aspect of the present invention, an information processing apparatus is comprising: a disk drive for recording and/or playing back information data on/from a detachable disk recording medium; an eject instruction device for instructing to eject the disk recording medium; a cancel instruction device for instructing to cancel ejection of the disk recording medium; and a control device for, when a cancel instruction by the cancel instruction device is received within a predetermined period of time after reception of an eject instruction of the disk recording medium by the eject instruction device, canceling an eject operation of the disk recording medium.

According to the second aspect of the present invention, a method of controlling an information processing apparatus, which comprises a disk drive for recording and/or playing back information data on/from a detachable disk recording medium, an eject instruction device for instructing to eject the disk recording medium, and a cancel instruction device for instructing to cancel ejection of the disk recording medium, is comprising: canceling, when a cancel instruction by the cancel instruction device is received within a predetermined period of time after reception of an eject instruction of the disk recording medium by the eject instruction device, an eject operation of the disk recording medium.

According to the third aspect of the present invention, a program is making a computer implement the aforementioned control method.

According to the fourth aspect of the present invention, a storage medium is computer-readably storing the aforementioned program.

According to the fifth aspect of the present invention, an information processing apparatuses comprising: a disk drive for recording and/or playing back information data on/from a detachable disk recording medium; a load/eject device for loading and ejecting the disk recording medium; a storage device for storing control information, which is read out from the disk recording medium and is associated with the disk recording medium; and a control device for, when the disk recording medium is set in a load state by the load/eject device again within a predetermined period of time after the disk recording medium is set in an eject state by the load/eject device, performing recording control or playback control of the disk recording medium using the control information stored in the storage device without reading out any control information from the disk recording medium.

According to the sixth aspect of the present invention, an information processing apparatus is comprising: a disk drive for recording and/or playing back information data on/from a detachable disk recording medium; a load/eject device for loading and ejecting the disk recording medium; a storage device for storing control information, which is read out from the disk recording medium and is associated with the disk recording medium; a detection device for detecting removal of the disk recording medium after the disk recording medium is brought to an eject state by the load/eject device; and a control device for, when the disk recording medium is set in a load state by the load/eject device again within a predetermined period of time after the disk recording medium is set in an eject state by the load/eject device and before removal of the disk recording medium from the information processing apparatus is detected by the detection device, performing recording control or playback control of the disk recording medium using the control information stored in the storage device without reading out any control information from the disk recording medium.

According to the seventh aspect of the present invention, a method of controlling an information processing apparatus, which comprises a disk drive for recording and/or playing back information data on/from a detachable disk recording medium, a load/eject device for loading and ejecting the disk recording medium, and a storage device for storing control information, which is read out from the disk recording medium and is associated with the disk recording medium, is comprising: performing, when the disk recording medium is set in a load state by the load/eject device again within a predetermined period of time after the disk recording medium is set in an eject state by the load/eject device, recording control or playback control of the disk recording medium using the control information stored in the storage device without reading out any control information from the disk recording medium.

According to the present invention, there is provided a method of controlling an information processing apparatus, wherein the control information includes management information of data recorded on the disk recording medium, and adjustment value information of power of a laser beam used to record and/or play back on/from the disk recording medium.

According to the eighth aspect of the present invention, a method of controlling an information processing apparatus, which comprises a disk drive for recording and/or playing back information data on/from a detachable disk recording medium, a load/eject device for loading and ejecting the disk recording medium, a storage device for storing control information, which is read out from the disk recording medium and is associated with the disk recording medium, and a detection device for detecting removal of the disk recording medium after the disk recording medium is brought to an eject state by the load/eject device, is comprising: performing, when the disk recording medium is set in a load state by the load/eject device again within a predetermined period of time after the disk recording medium is set in an eject state by the load/eject device and before removal of the disk recording medium from the information processing apparatus is detected by the detection device, recording control or playback control of the disk recording medium using the control information stored in the storage device without reading out any control information from the disk recording medium.

According to the ninth aspect of the present invention, a program is making a computer implement the aforementioned control method.

According to the tenth aspect of the present invention, a storage medium is computer-readably storing the aforementioned program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BEST MODE FOR CARRYING OUT THE INVENTION

Preferred embodiments of the present invention will be described in detail hereinafter with reference to the accompanying drawings.

First Embodiment

Figure 1:
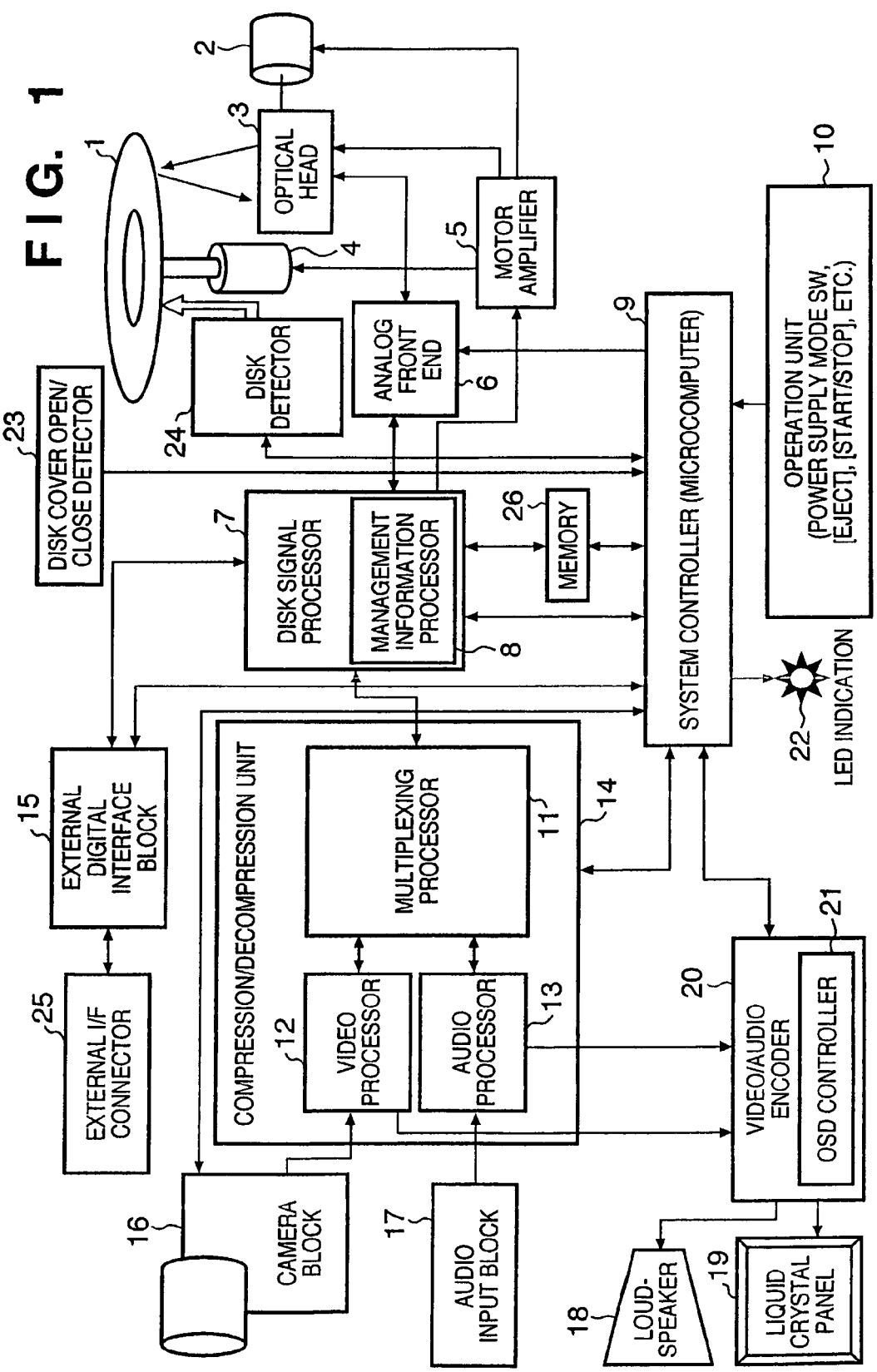
FIG. 1 is a block diagram showing the arrangement the first embodiment of a camera-integrated optical disk recording/playback apparatus to which the present invention is applied.

FIG. 1 is a block diagram showing the arrangement the first embodiment of a camera-integrated optical disk recording/playback apparatus to which the present invention is applied.

A camera block 16 comprises an image sensing lens, a motor for driving the lens, a CCD, and the like. The camera block 16 converts a sensed image signal into digital data, and outputs the digital data to a video processor 12 in a compression/decompression processor 14. An audio input block 17 comprises an audio microphone and the like, converts a picked-up audio signal into digital data, and outputs the digital data to an audio processor 13 of the compression/decompression processor 14.

The video processor 12 applies DCT (discrete cosine transformation) processing, quantization processing, and the like to video data supplied from the camera block 16 on the basis of a signal compression format such as MPEG or the like, and outputs the compressed video data to a multiplexing processor 11. The video processor 12 decompresses video data supplied from the multiplexing processor 11 on the basis of the format such as MPEG or the like, and outputs the acquired video data to a video/audio encoder 20.

The audio processor 13 compresses audio data supplied from the audio input block 17 on the basis of a format such as MPEG audio, Dolby digital, linear PCM, or the like, and outputs the obtained audio data to the multiplexing processor 11. Also, the audio processor 13 decompresses audio data supplied from the multiplexing processor 11, and outputs the acquired audio data to the video/audio encoder 20.

The video/audio encoder 20 includes an OSD (on-screen display) controller 21. The video/audio encoder 20 encodes video data supplied from the video processor 12, appends various kinds of display information (text, icons, and the like) to the user generated by the OSD controller 21, and outputs the encoded video data on a liquid crystal panel 19. Also, the video/audio encoder 20 encodes audio data supplied from the audio processor 13, and outputs the encoded audio data to a loudspeaker 18.

The multiplexing processor 11 multiplexes video data supplied from the video processor 12, and audio data supplied from the audio processor 13, and outputs the acquired mixing data to a disk signal processor 7.

Also, the multiplexing processor 11 demultiplexes data supplied from the disk signal processor 7 into video and audio data, and respectively outputs the video data to the video processor 12 and the audio data to the audio processor 13.

When the user inputs a video recording instruction, the disk signal processor 7 appends management information including the contents No., image sensing date, image sensing conditions, contents title, and the like, and predetermined error correction blocks to data supplied from the multiplexing processor 11 in the compression/decompression processor 14 under the control of a system controller (microcomputer) 9, and outputs that data to an analog front end 6. Also, the management information is temporarily stored in a memory 26.

When the user inputs a recording instruction of an external input signal, the disk signal processor 7 outputs data supplied from an external digital interface block 15 to the analog front end 6.

When the user inputs a playback instruction, the disk signal processor 7 demodulates a disk playback stream supplied from the analog front end 6, applies predetermined error correction, descrambling, and the like, outputs the obtained data to the compression/decompression unit 14 and external digital interface block 15, separates the aforementioned management information, and outputs it to the system controller 9.

The external digital interface block 15 comprises USB, IEEE1394, or the like, and exchanges video and audio signals, control commands, and the like with an external device via an external I/F connector 25 in accordance with an instruction from the system controller 9.

The disk signal processor 7 generates a servo-system signal required to control a spindle motor 4, optical head 3, and carriage motor 2 on the basis of a tracking error signal supplied from the analog front end 6, and outputs it to a motor amplifier 5.

Under the control of the system controller 9, the analog front end 6 converts a disk recording stream supplied from the disk signal processor 7 into an analog signal, applies processing such as amplification and the like to the converted signal, and outputs the processed signal to the optical head 3. Also, the analog front end 6 controls light emission in the optical head 3.

Upon reading out data recorded on an optical disk medium (to be also referred to as a disk hereinafter) 1, the analog front end 6 amplifies a signal which is supplied from the optical head 3 and corresponds to reflected light of a laser, converts the amplified signal into a digital signal, and outputs the converted signal to the disk signal processor 7 as a disk playback stream. The analog front end 6 generates a tracking error signal or the like on the basis of a signal which is supplied from the optical head 3 and corresponds to the intensity of reflected light, converts the signal into a digital signal, and outputs the digital signal to the disk signal processor 7.

The motor amplifier 5 generates a spindle control signal, focusing/tracking control signal, and carriage control signal on the basis of the servo-system signal supplied from the disk signal processor 7, and outputs these signals to the spindle motor 4, optical head 3, and carriage motor 2, thereby controlling these units.

The spindle motor 4 rotates the loaded disk recording medium 1 at a predetermined rotation velocity on the basis of the spindle control signal supplied from the motor amplifier 5.

The optical head 3 irradiates a predetermined position on the disk recording medium 1 with a laser beam from an irradiation unit (not shown) on the basis of the focusing/tracking control signal supplied from the motor amplifier 5 and the control of the analog front end 6. The optical head 3 receives the laser beam which is output from the irradiation unit and is reflected by the surface of the disk recording medium 1, reads pits on the disk recording medium 1, and outputs a signal corresponding to the intensity of reflected light to the analog front end 6.

The carriage motor 2 moves the optical head 3 to a predetermined position on a line that connects between the center and circumference of the disk recording medium 1, and allows the optical head 3 to irradiate a predetermined pit track on the disk recording medium 1 with a laser and to read data recorded on the disk recording medium 1.

An optical system including the disk signal processor 7, analog front end 6, optical head 3, and the like executes calibration operations such as optimization of servo gains of focus and spindle servo systems, laser power, and the like, which are unique to a loaded disk upon loading the disk recording medium 1, in accordance with an instruction from the system controller 9.

An operation unit 10 comprises a camera-system operation unit including various switches ([ZOOM], [FOCUS], and the like) associated with camera-system operations, a playback-system operation unit including various switches ([UP], [DOWN], [MENU], [SET], [PLAY], [FF/REW], [STOP], [START/STOP], [EJECT], [CANCEL], and the like) associated with a playback system and the overall apparatus, a power supply mode SW (switch) for selecting a power supply mode (camera, playback, OFF) of the main body, and the like. The operation unit 10 outputs a user's instruction to the system controller 9.

A disk detector 24 mechanically detects the presence/absence of a loaded disk in accordance with an instruction from the system controller 9, and transmits detection information to the system controller 9. A disk cover Open/Close detector 23 detects the state of a disk cover, and transmits it to the system controller 9.

An LED 22 makes lighting/flickering in accordance with an instruction from the system controller 9 to issue simple information to the user.

The memory 26 is a semiconductor memory which temporarily stores the calibration result information, management information of respective contents, management information of a disk free space, and the like upon loading the disk recording medium 1.

The system controller 9 comprises a microcomputer that comprehensively controls various functions, a control program storage ROM, a work RAM for various kinds of processing, an I/O port, a timer counter, and the like. The system controller 9 controls the overall operation of the camera-integrated optical disk recording/playback apparatus, which includes the analog front end 6, disk signal processor 7, compression/decompression unit 14, external digital interface block 15, disk detector 24, and video/audio encoder 20, on the basis of a signal which is supplied from the operation unit 10 and corresponds to a user's instruction.

The system controller 9 executes calibration operations such as optimization of the servo gains and laser power, and the like, as described above, by controlling the optical system upon loading of the disk recording medium 1. Also, the system controller 9 reads out management information recorded on a predetermined area of the disk recording medium 1, and stores it in the memory 26. The system controller 9 updates the contents of the management information stored in the memory 26 every time it executes recording/playback of data with respect to the disk recording medium 1, and reads out the management information from the memory 26 and writes it on the disk recording medium 1 in response to an unloading instruction of the disk recording medium 1.

The first operation for canceling a disk unloading operation in the camera-integrated optical disk recording/playback apparatus will be described below with reference to FIG. 2 that shows the flowchart of the disk unloading operation cancel processing, and FIG. 3 that shows operation images of the disk unloading operation cancel processing.

Upon depression of an [EJECT] SW (SW represents a switch hereinafter) of the operation unit 10 in step S202 in FIG. 2 (see 301 in FIG. 3), the disk unloading operation starts. More specifically, an operation for saving information associated with the current disk (the calibration information, management information, free area information, and the like; these kinds of information will also be generically referred to as control information hereinafter) on the memory 26 starts in step S203. The flow then advances to step S204 to start an operation for writing required data such as disk management information and the like on the disk.

Note that the operation for saving the information associated with the current disk on the memory 26 in step S203, the operation for writing the required data (control information) such as disk management information and the like on the disk in step S204, and the like will be referred to as a preparation operation required to unload the disk (unloading preparation operation) hereinafter, and a combination of this unloading preparation operation and a final disk cover open operation will be referred to as a disk unloading operation hereinafter.

In step S205, a message indicating that a disk unloading operation and unloading cancel operation are valid is displayed on the liquid crystal panel 19 (see 302 in FIG. 3) in accordance with an instruction from the system controller 9 and OSD controller 21. In this state, since the disk unloading preparation operation is still executed, the disk cover is not opened, and the disk unloading preparation operation can be continued, or the disk unloading operation can be canceled by pressing the [EJECT] SW again.

It is checked in step S206 whether or not the [EJECT] SW of the operation unit 10 is pressed again. If the [EJECT] SW is pressed again (see 303 in FIG. 3), the flow branches to step S210; otherwise, the flow advances to step S207 to confirm if the unloading preparation operation is complete. If it is confirmed in step S207 that the disk unloading preparation operation is complete, the disk cover is opened in step S208, and the processing ends in step S209.

If the [EJECT] SW is pressed in step S202, since the disk unloading preparation operation is executed, a given time (e.g., about 5 sec) is required to execute this unloading preparation operation until the disk cover is opened in practice. For this reason, if the [EJECT] SW is pressed again in step S206 to issue a cancel instruction during the execution time period of this unloading preparation operation, the following disk unloading operation cancel processing is executed.

If the [EJECT] SW is pressed again in step S206 to issue a cancel instruction during the unloading preparation operation, disk unloading operation cancel processing is executed in step S210. In this case, if the management information has been written on the disk, the written management information is erased, and the information saved on the memory 26 in step S203 is restored to the work RAM for various kinds of processing in the system controller 9 to recover the state before the beginning of the disk unloading operation. Then, the control transits to the operation state before the beginning of the disk unloading operation in step S211.

In this embodiment, the text message indicating that the unloading cancel instruction is valid is displayed on the liquid crystal panel 19 in step S205. Alternatively, flickering of the LED 22, a beep tone produced via the loudspeaker 18, and the like may be used instead. Furthermore, none of these means may be used.

Second Embodiment

Figure 4:
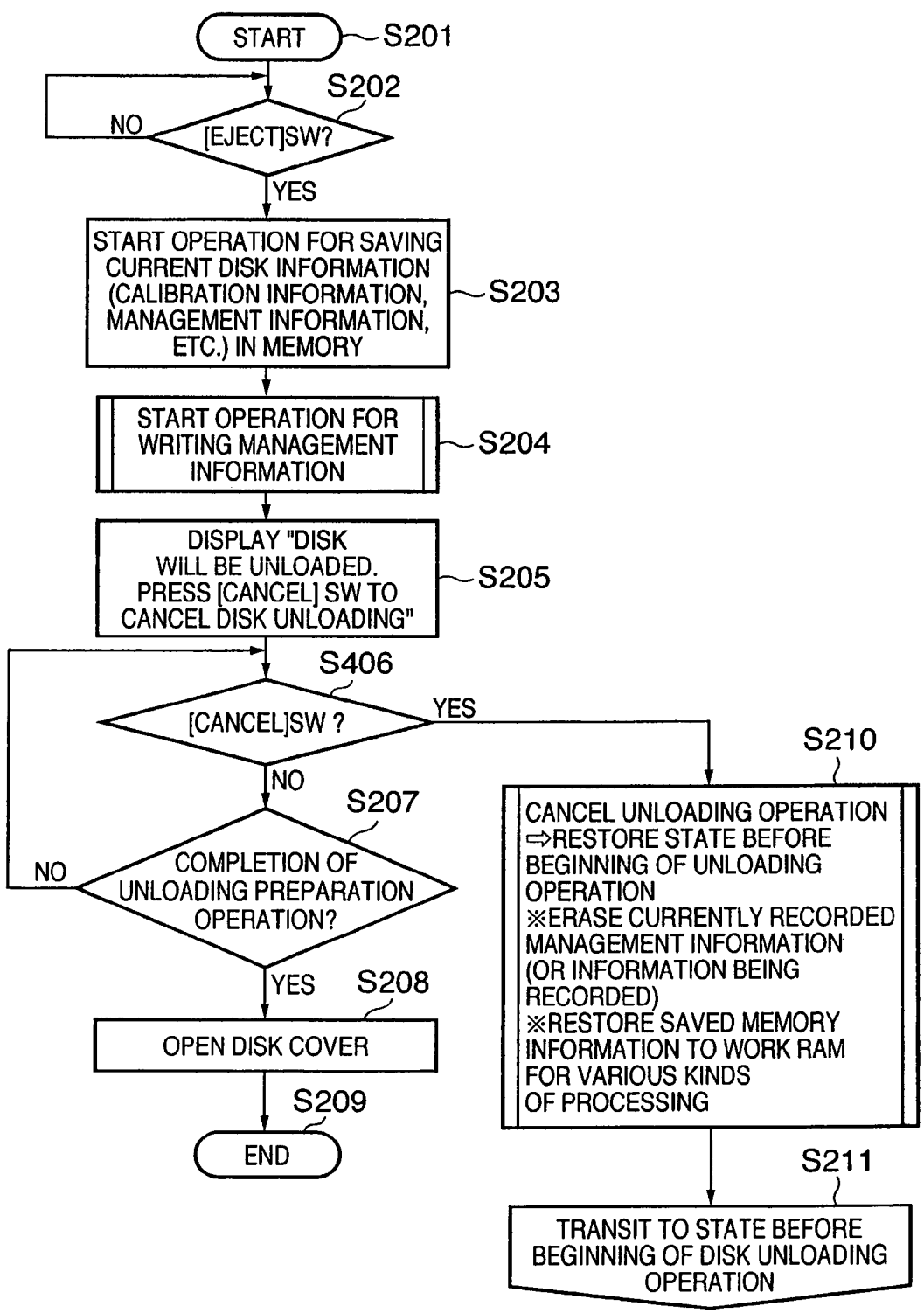
FIG. 4 is a flowchart showing disk unloading operation cancel processing in the second embodiment.

The second operation for canceling a disk unloading operation in a camera-integrated optical disk recording/playback apparatus with the same arrangement as that of the first embodiment will be described below with reference to FIG. 4 which shows the flowchart of the disk unloading operation cancel processing.

Figure 2:
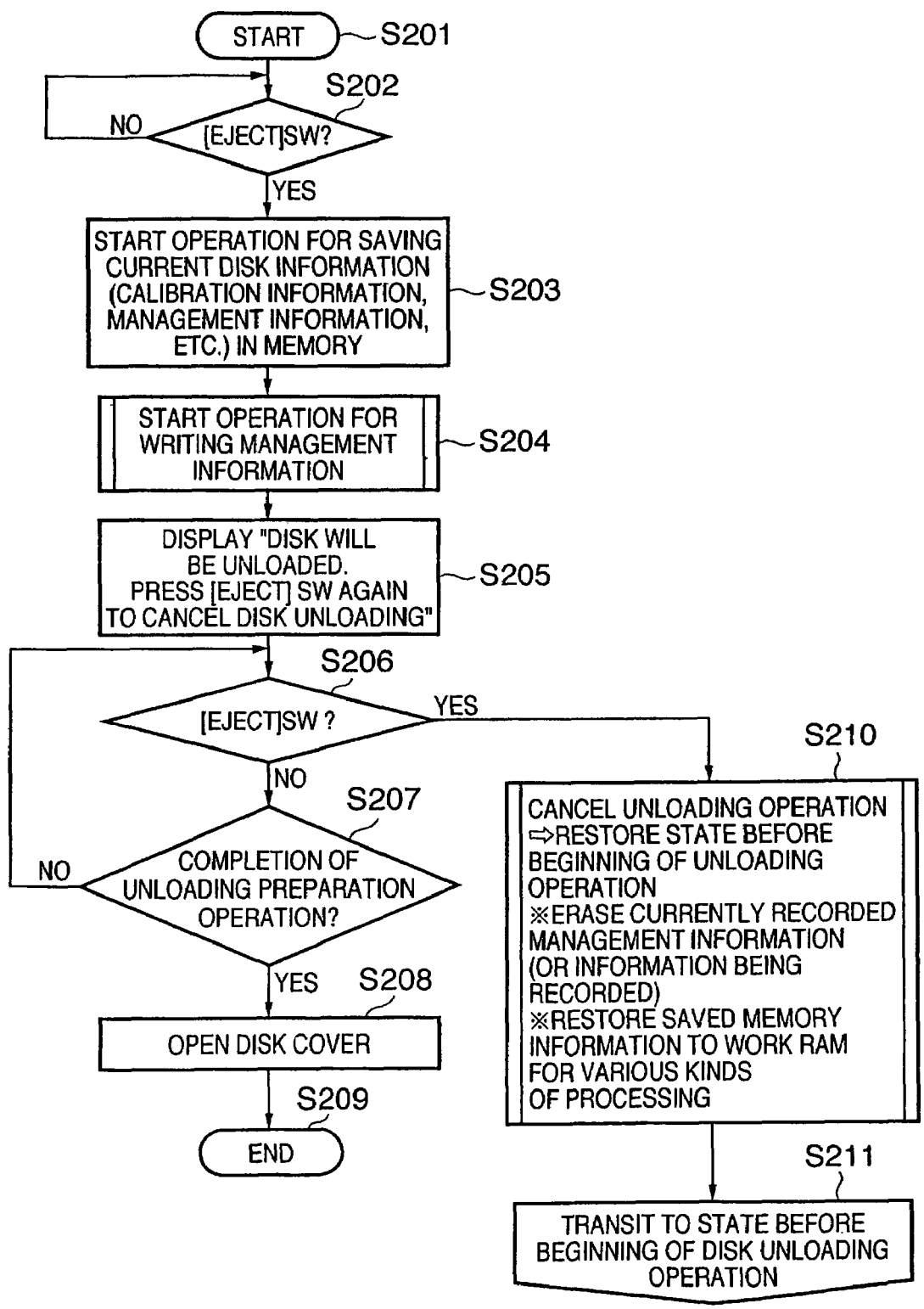
FIG. 2 is a flowchart showing disk eject operation cancel processing in the first embodiment.
Figure 3:
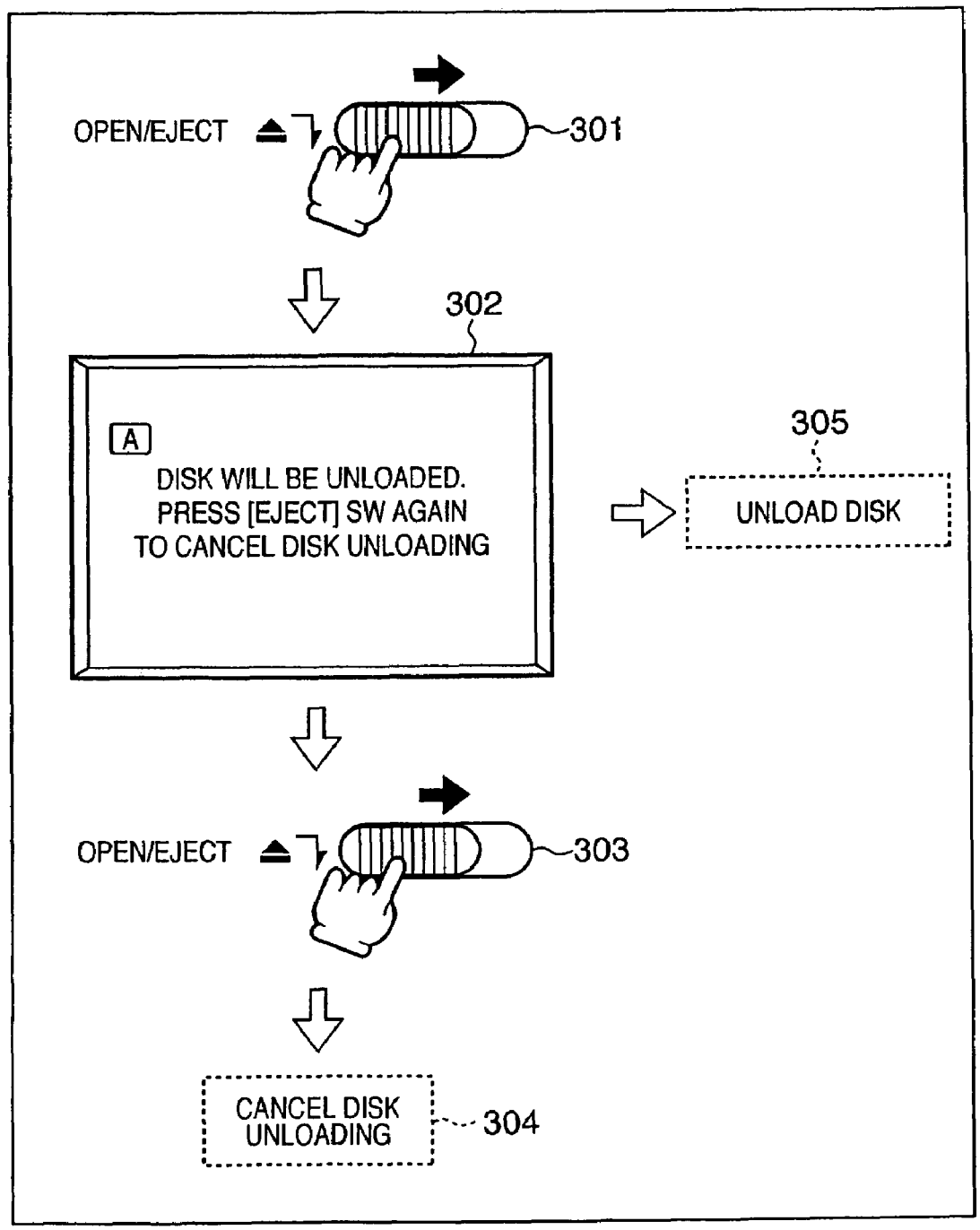
FIG. 3 shows operation images of the disk unloading operation cancel processing.

The cancel operation of the second embodiment is substantially the same as the flowchart of FIG. 2 that shows the operation of the first embodiment except for only step S406.

In step S206 in the first embodiment, the [EJECT] SW of the operation unit 10 is used to issue a cancel instruction of the disk unloading operation. However, in the second embodiment, a cancel instruction is issued by detecting a dedicated [CANCEL] SW of the operation unit 10. If the [CANCEL] SW of the operation unit 10 is pressed before completion of the disk unloading preparation operation in step S406, the flow branches to step S210 to execute the disk unloading operation cancel processing. Since other steps are the same as those in the first embodiment, a description thereof will be omitted.

Third Embodiment

Figure 5:
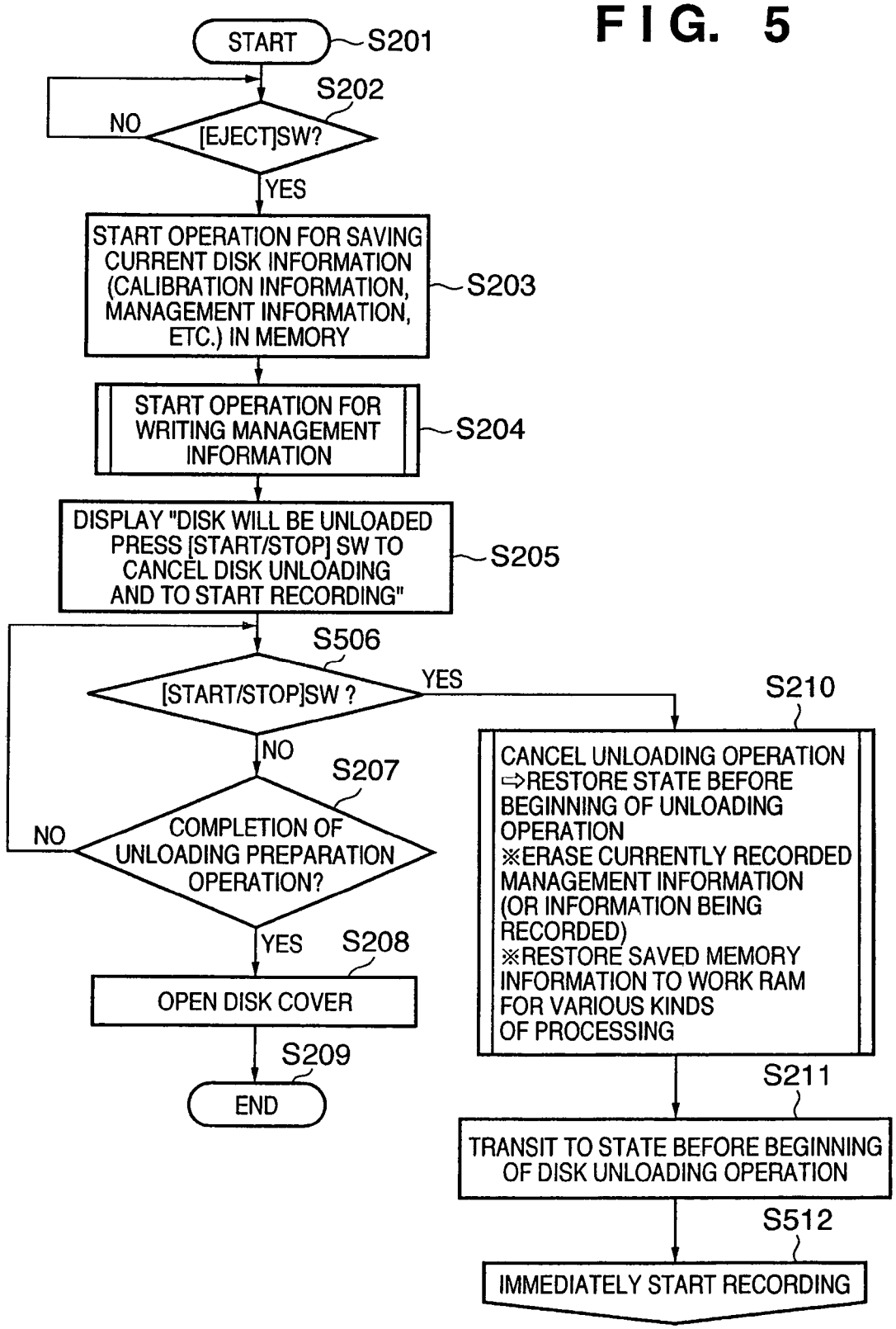
FIG. 5 is a flowchart showing disk unloading operation cancel processing in the third embodiment.

The third operation for canceling a disk unloading operation in a camera-integrated optical disk recording/playback apparatus with the same arrangement as that of the first embodiment will be described below with reference to FIG. 5 which shows the flowchart of the disk unloading operation cancel processing.

The cancel operation of the third embodiment is substantially the same as the flowchart of FIG. 2 that shows the operation of the first embodiment except for only steps S506 and S512.

In step S206 in the first embodiment, the [EJECT] SW of the operation unit 10 is used to issue a cancel instruction of the disk unloading operation. However, in the third embodiment, a cancel instruction is issued by detecting the [START/STOP] SW of the operation unit 10. If the [START/STOP] SW of the operation unit 10 is pressed before completion of the disk unloading preparation operation in step S506, the flow branches to step S210 to execute the disk unloading operation cancel processing. After the control transits to the operation state before the beginning of the unloading operation in step S211, recording is restarted in step S512. Since other steps are the same as those in the first embodiment, a description thereof will be omitted.

Fourth Embodiment

The fourth operation for canceling a disk unloading operation in a camera-integrated optical disk recording/playback apparatus with the same arrangement as that of the first embodiment will be described below with reference to FIG. 7 which shows the flowchart of the disk unloading operation cancel processing, and FIG. 6 which shows a display example of a UI (user interface) upon setting a disk unloading cancel instruction valid time.

In this embodiment, the user can arbitrarily set a disk unloading cancel valid time.

The setting of the disk unloading cancel instruction valid time will be explained first.

Figure 6:
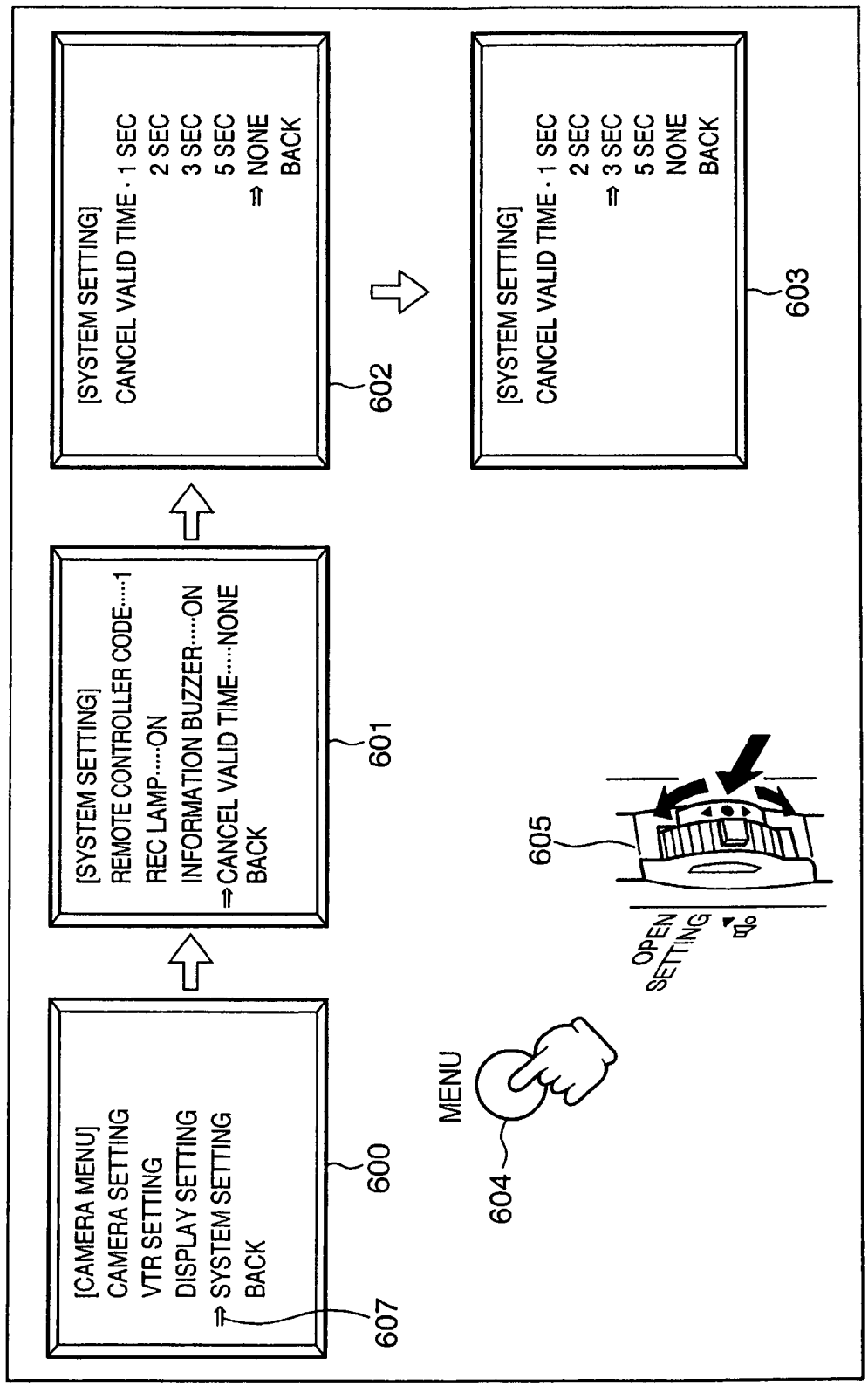
FIG. 6 shows a valid time setting window of a disk unloading operation cancel instruction.
Figure 7:
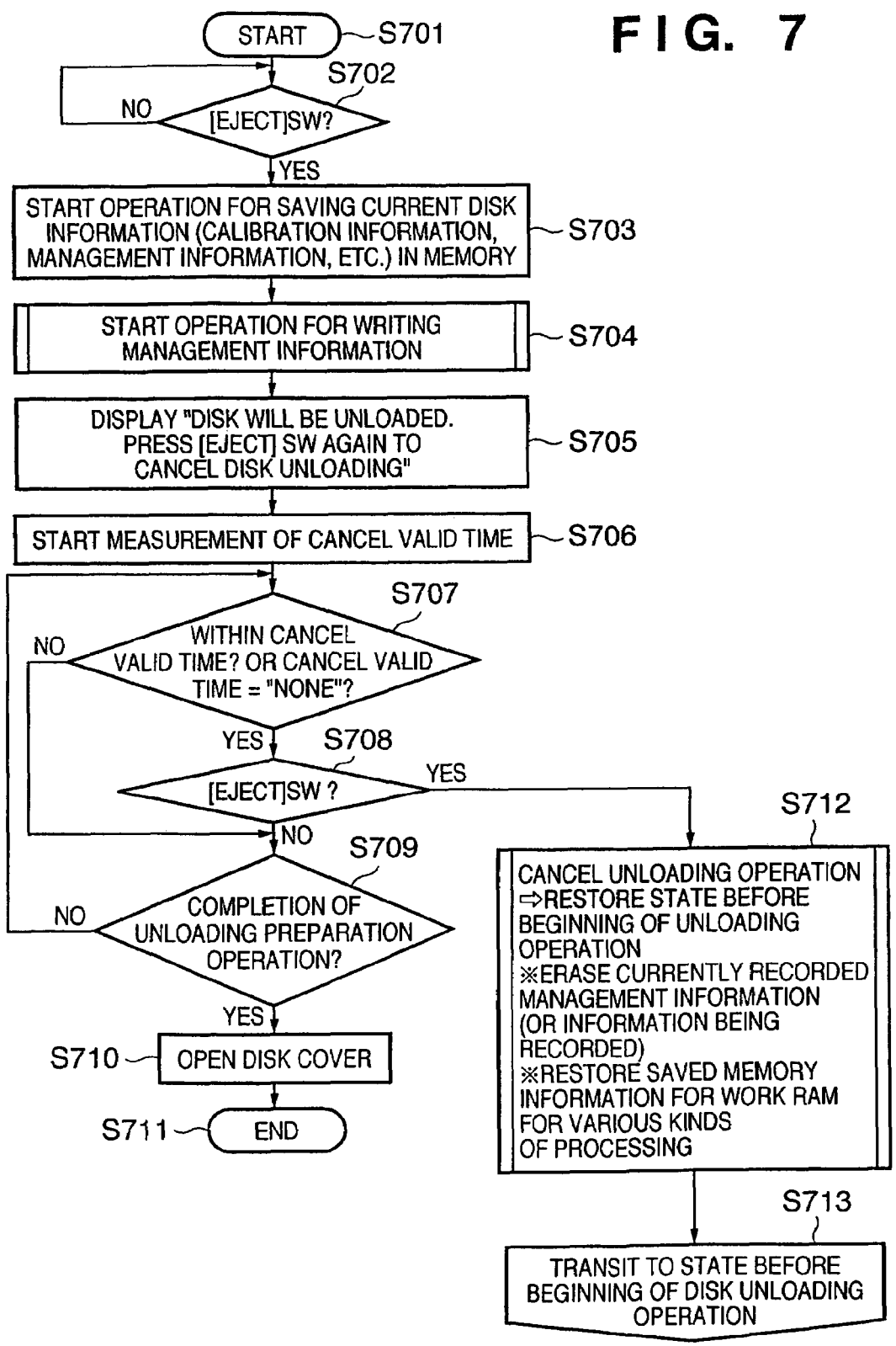
FIG. 7 is a flowchart showing disk unloading operation cancel processing in the fourth embodiment.

The user presses the [MENU] SW of the operation unit 10 (see 604 in FIG. 6) to launch [camera menu] (see 600 in FIG. 6). The user moves a menu cursor 607 by operating an [UP]/[DOWN] SW (see 605 in FIG. 6) to select an item "system setting", and then presses a [SET] SW of the operation unit 10 (see 605 in FIG. 6). Then, a [system setting] menu 601 in FIG. 6 is displayed. On this menu, the user similarly operates the [UP]/[DOWN] SW 605 in FIG. 6 to select "cancel valid time". Then, a cancel valid time setting menu 602 in FIG. 6 is displayed. In this case, since "none" is selected as a default value, the user selects and sets a desired time (e.g., "3 sec" in this case) (see 603 in FIG. 6) by operating the [UP]/[DOWN] SW 605 in FIG. 6 in the same manner as above. Note that the times displayed as candidates of the cancel valid time are equal to or shorter than the aforementioned time required for the disk unloading preparation (longest), and a time longer than that time cannot be set.

The disk unloading cancel operation in the fourth embodiment will be described below.

Since steps S701 to S705 are the same as steps S201 to S205 of the first embodiment, a description thereof will be omitted.

In step S706, the cancel valid time set in advance by the aforementioned method begins to be counted. This count processing uses the timer counter of the system controller 9. However, if the setting of the cancel valid time is "none", the count operation is not performed.

It is checked in step S707 if the count time falls within the cancel valid time or the setting of the cancel valid time is "none". If the count time falls within the cancel valid time or the setting of the cancel valid time is "none", the flow branches to step S708 to check whether or not the [EJECT] SW is pressed again as in the first embodiment. if the [EJECT] SW is pressed again, the flow branches to step S712 to execute the unloading operation cancel processing. However, if it is determined in step S707 that the valid time has expired, the control branches to step S709 while skipping step S708 to inhibit the unloading operation cancel instruction from being accepted. Since steps S709 to S713 are the same as steps S207 to S211 of the first embodiment, a description thereof will be omitted.

As described above, according to the first to fourth embodiments, even when the user inadvertently issues an eject instruction, he or she can cancel the eject operation, and can obtain the effects of catching an unexpected recording chance, and quickly recovering the disk unloading operation due to an operation error.

If the disk unloading cancel instruction is issued, the operation of the apparatus is controlled using the management information stored in the memory upon reception of the disk eject instruction intact. Hence, the management information need not be read out from the disk again, and the recording or playback operation on/from the disk can be immediately restarted.

Fifth Embodiment

Figure 8:
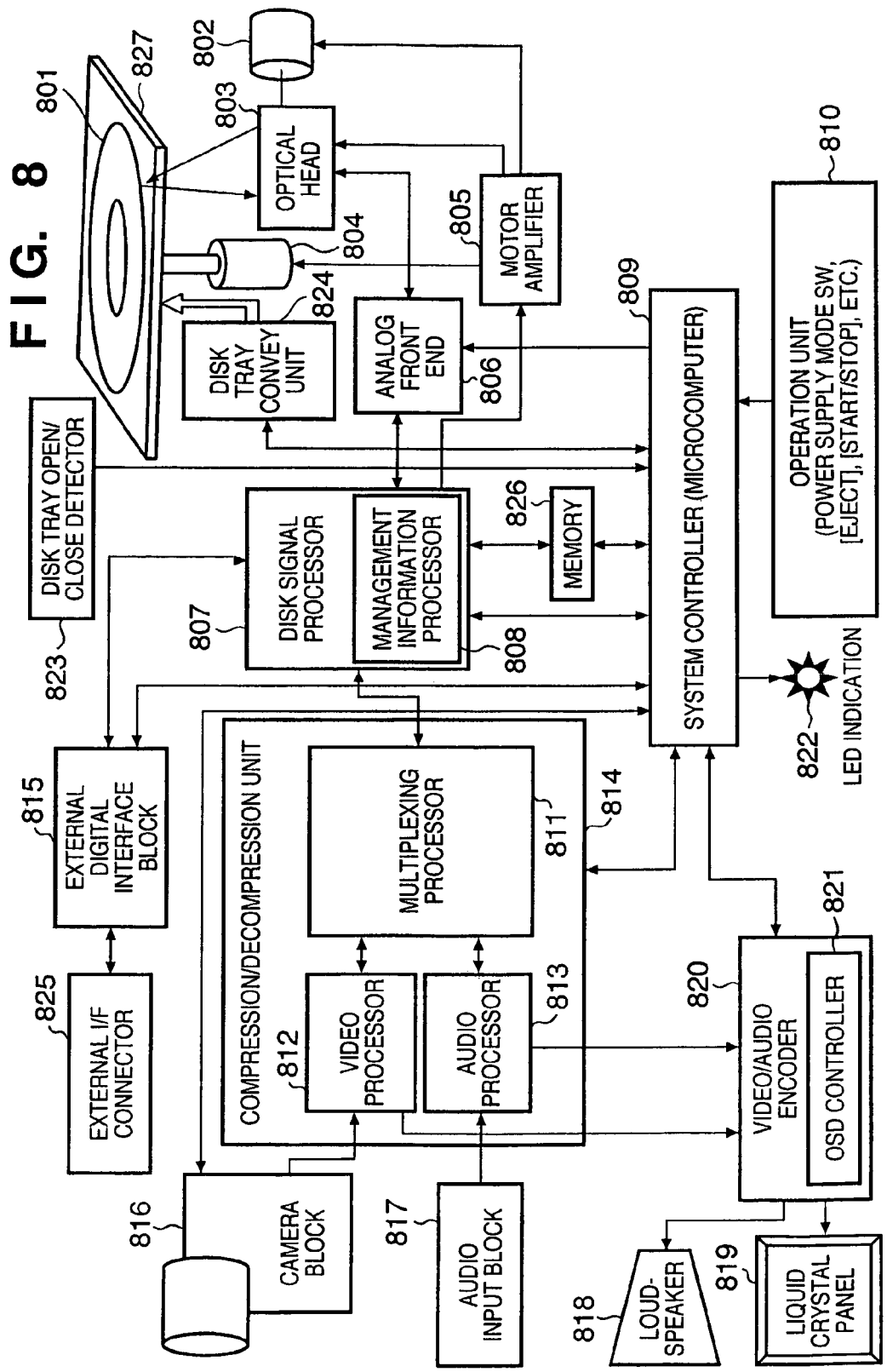
FIG. 8 is a block diagram showing the arrangement of the fifth embodiment of a camera-integrated optical disk recording/playback apparatus to which the present invention is applied.

FIG. 8 is a block diagram showing the arrangement the fifth embodiment of a camera-integrated optical disk recording/playback apparatus to which the present invention is applied.

In this embodiment, assume that the camera-integrated optical disk recording/playback apparatus adopts an auto-loading mechanism which automatically loads or ejects a tray, which mounts a disk recording medium, by a motor or the like, so as to automatically load and eject the disk recording medium.

A camera block 816 comprises an image sensing lens, a motor for driving the lens, a CCD, and the like. The camera block 816 converts a sensed image signal into digital data, and outputs the digital data to a video processor 812 in a compression/decompression processor 814. An audio input block 817 comprises an audio microphone and the like, converts a picked-up audio signal into digital data, and outputs the digital data to an audio processor 813 of the compression/decompression processor 814.

The video processor 812 applies DCT (discrete cosine transformation) processing, quantization processing, and the like to video data supplied from the camera block 816 on the basis of a signal compression format such as MPEG or the like, and outputs the compressed video data to a multiplexing processor 811. The video processor 812 decompresses video data supplied from the multiplexing processor 811 on the basis of the format such as MPEG or the like, and outputs the acquired video data to a video/audio encoder 820.

The audio processor 813 compresses audio data supplied from the audio input block 817 on the basis of a format such as MPEG audio, Dolby digital, linear PCM, or the like, and outputs the obtained audio data to the multiplexing processor 811. Also, the audio processor 813 decompresses audio data supplied from the multiplexing processor 811, and outputs the acquired audio data to the video/audio encoder 820.

The video/audio encoder 820 includes an OSD (on-screen display) controller 821. The video/audio encoder 820 encodes video data supplied from the video processor 812, appends various kinds of display information (text, icons, and the like) to the user generated by the OSD controller 821, and outputs the encoded video data on a liquid crystal panel 819. Also, the video/audio encoder 820 encodes audio data supplied from the audio processor 813, and outputs the encoded audio data to a loudspeaker 818.

The multiplexing processor 811 multiplexes video data supplied from the video processor 812, and audio data supplied from the audio processor 813, and outputs the acquired mixing data to a disk signal processor 807.

Also, the multiplexing processor 811 demultiplexes data supplied from the disk signal processor 807 into video and audio data, and respectively outputs the video data to the video processor 812 and the audio data to the audio processor 813.

When the user inputs a video recording instruction, the disk signal processor 807 appends management information including the contents No., image sensing date, image sensing conditions, contents title, and the like, and predetermined error correction blocks to data supplied from the multiplexing processor 811 in the compression/decompression processor 814 under the control of a system controller (microcomputer) 809, and outputs that data to an analog front end 806. Also, the management information is temporarily stored in a memory 826.

When the user inputs a recording instruction of an external input signal, the disk signal processor 807 outputs data supplied from an external digital interface block 815 to the analog front end 806.

When the user inputs a playback instruction, the disk signal processor 807 demodulates a disk playback stream supplied from the analog front end 806, applies predetermined error correction, descrambling, and the like, outputs the obtained data to the compression/decompression unit 814 and external digital interface block 815, separates the aforementioned management information, and outputs it to the system controller 809.

The external digital interface block 815 comprises USB, IEEE1394, or the like, and exchanges video and audio signals, control commands, and the like with an external device via an external I/F connector 825 in accordance with an instruction from the system controller 809.

The disk signal processor 807 generates a servo-system signal required to control a spindle motor 804, optical head 803, and carriage motor 802 on the basis of a tracking error signal supplied from the analog front end 806, and outputs it to a motor amplifier 805.

Under the control of the system controller 809, the analog front end 806 converts a disk recording stream supplied from the disk signal processor 807 into an analog signal, applies processing such as amplification and the like to the converted signal, and outputs the processed signal to the optical head 803. Also, the analog front end 806 controls light emission in the optical head 803.

Upon reading out data recorded on an optical disk medium (to be also referred to as a disk hereinafter) 801, the analog front end 806 amplifies a signal which is supplied from the optical head 803 and corresponds to reflected light of a laser, converts the amplified signal into a digital signal, and outputs the converted signal to the disk signal processor 807 as a disk playback stream. The analog front end 806 generates a tracking error signal or the like on the basis of a signal which is supplied from the optical head 803 and corresponds to the intensity of reflected light, converts the signal into a digital signal, and outputs the digital signal to the disk signal processor 807.

The motor amplifier 805 generates a spindle control signal, focusing/tracking control signal, and carriage control signal on the basis of the servo-system signal supplied from the disk signal processor 807, and outputs these signals to the spindle motor 804, optical head 803, and carriage motor 802, thereby controlling these units.

The spindle motor 804 rotates the loaded disk recording medium 801 at a predetermined rotation velocity on the basis of the spindle control signal supplied from the motor amplifier 805.

The optical head 803 irradiates a predetermined position on the disk recording medium 801 with a laser beam from an irradiation unit (not shown) on the basis of the focusing/tracking control signal supplied from the motor amplifier 805 and the control of the analog front end 806. The optical head 803 receives the laser beam which is output from the irradiation unit and is reflected by the surface of the disk recording medium 801, reads pits on the disk recording medium 801, and outputs a signal corresponding to the intensity of reflected light to the analog front end 806.

The carriage motor 802 moves the optical head 803 to a predetermined position on a line that connects between the center and circumference of the disk recording medium 801, and allows the optical head 803 to irradiate a predetermined pit track on the disk recording medium 801 with a laser and to read data recorded on the disk recording medium 801.

An optical system including the disk signal processor 807, analog front end 806, optical head 803, and the like executes calibration operations such as optimization of servo gains of focus and spindle servo systems, laser power, and the like, which are unique to a loaded disk upon loading the disk recording medium 801, in accordance with an instruction from the system controller 809. For example, as for the laser power adjustment operation, in case of a rewritable disk such as a DVD-RAM, predetermined data is recorded a plurality of number of times using different laser powers on a predetermined calibration area. As a result of reading these data, the laser power that causes fewer errors is selected as an optimal value. Normally, since several data write and read operations are repeated while changing the laser power, the adjustment operation takes time.

An operation unit 810 comprises a camera-system operation unit including various switches ([ZOOM], [FOCUS], and the like) associated with camera-system operations, a playback-system operation unit including various switches ([UP], [DOWN], [MENU], [SET], [PLAY], [FF/REW], [STOP], [START/STOP], [EJECT], [CANCEL], and the like) associated with a playback system and the overall apparatus, a power supply mode SW (switch) for selecting a power supply mode (camera, playback, OFF) of the main body, and the like. The operation unit 810 outputs a user's instruction to the system controller 809.

A disk tray convey unit 824 conveys a disk tray 827 between the disk attachment/detachment position and disk access position in accordance with an instruction from the system controller 809. A disk cover Open/Close detector 823 detects the state of the disk tray, and transmits it to the system controller 809.

An LED 822 makes lighting/flickering in accordance with an instruction from the system controller 809 to issue simple information to the user.

The memory 826 is a semiconductor memory which temporarily stores the calibration result information, management information of respective contents, management information of a disk free space, and the like upon loading the disk recording medium 801.

The system controller 809 comprises a microcomputer that comprehensively controls various functions, a control program storage ROM, a work RAM for various kinds of processing, an I/O port, a timer counter, and the like. The system controller 809 controls the overall operation of the camera-integrated optical disk recording/playback apparatus, which includes the analog front end 806, disk signal processor 807, compression/decompression unit 814, external digital interface block 815, disk tray convey unit 824, and video/audio encoder 820, on the basis of a signal which is supplied from the operation unit 810 and corresponds to a user's instruction.

The system controller 809 executes calibration operations such as optimization of the servo gains and laser power, and the like, as described above, by controlling the optical system upon loading of the disk recording medium 801. Also, the system controller 809 reads out management information recorded on a predetermined area of the disk recording medium 801, and stores it in the memory 826. The system controller 809 updates the contents of the management information stored in the memory 826 every time it executes recording/playback of data with respect to the disk recording medium 801, and reads out the management information from the memory 826 and writes it on the disk recording medium 801 in response to an unloading instruction of the disk recording medium 801.

The operation for skipping an initial operation for disk access in the camera-integrated optical disk recording/playback apparatus will be described below with reference to FIG. 9 that shows the flowchart of the initial operation skip operation for disk access, and FIG. 11 that shows a countdown display of an allowable initial operation skip time timer.

Upon depression of an [EJECT] SW of the operation unit 810 in step S902, information associated with the current disk (the calibration information, management information, free area information, and the like; these kinds of information will also be generically referred to as control information hereinafter) is saved on the memory 826 in step S903. The flow then advances to step S904 to start a disk rotation stop operation. In step S905, the control waits until the rotation of the disk stops. After the rotation stops, the flow advances to step S906. In step S906, an allowable initial operation skip time timer is set to start a countdown operation. Note that the timer value to be set in this step may be a time set as a default value of the system, or may be a time set by the user, as will be described later. In step S907, the disk tray convey unit 824 is controlled to start a disk unloading operation.

It is checked in step S908 if the disk unloading operation is complete. If the disk unloading operation is complete, the flow branches to step S909; otherwise, the flow branches to step S910. It is checked in step S909 if the countdown operation of the allowable initial operation skip time timer is complete. If the countdown operation of the allowable initial operation skip time timer is complete, the flow branches to step S916 to completely end the disk unloading operation. If the countdown operation of the allowable initial operation skip time timer is not complete yet, the flow branches to step S910 to check if the [EJECT] SW of the operation unit 810 is pressed again. If the [EJECT] SW is pressed again, the flow branches to step S911; otherwise, the flow returns to step S908. Note that the [EJECT] SW is pressed to instruct the disk unloading operation when the disk has already been loaded, or to instruct the loading operation when the disk is not loaded yet.

Figure 11:
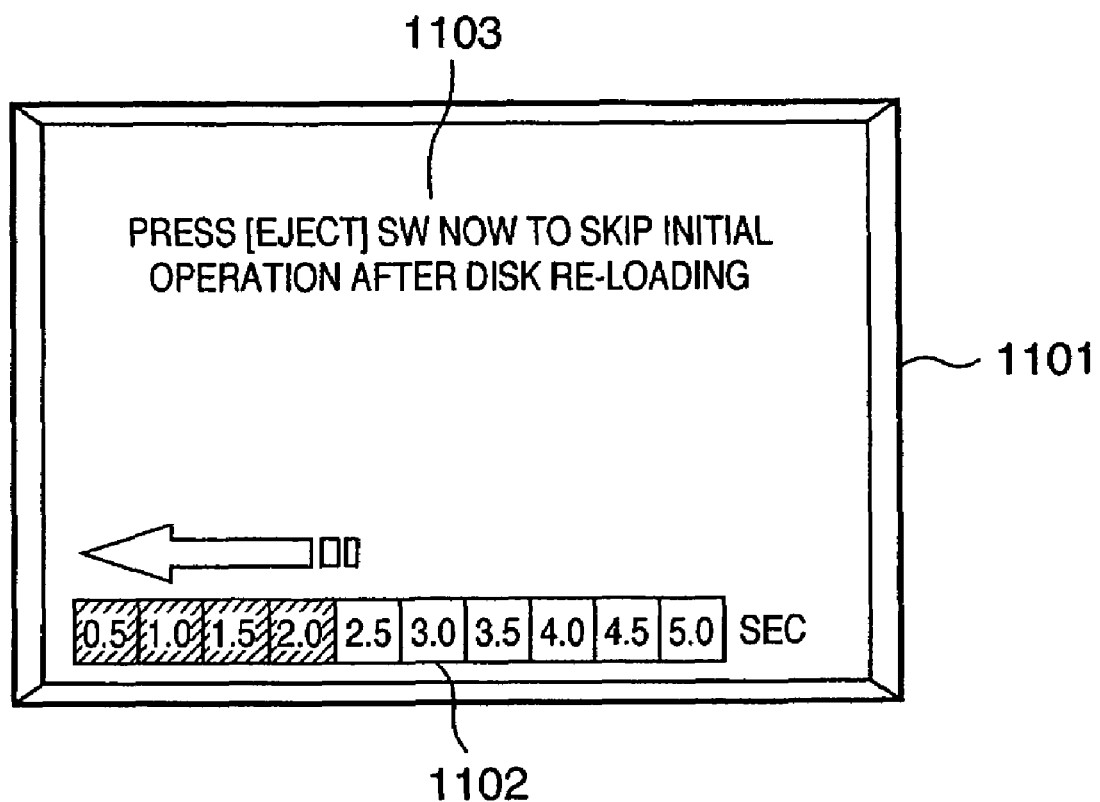
FIG. 11 shows a countdown display example of an allowable initial operation skip time timer in the fifth embodiment.

FIG. 11 shows an example of a display 1101 on the liquid crystal panel 819, which indicates the status of the countdown operation. In FIG. 11, numerals indicating times are displayed within a progress bar indicating the status of the countdown operation, and a "box" corresponding to the remaining time is highlighted (1102 in FIG. 11). Also, a message (e.g., 1103 in FIG. 11) is displayed to make the user easily understand the current status. Note that such display may be or may not be made.

The disk tray convey unit 824 is controlled to start the disk loading operation in step S911, and the control waits for completion of the loading operation in step S912. If completion of the loading operation can be confirmed, the disk rotation operation starts in step S913. In step S914, the control information (the calibration information, management information, free area information, and the like) temporarily saved on the memory 826 in step S903 is restored to the work RAM for various kinds of processing in the system controller 809, thus skipping some initial operations required for disk access. The flow then advances to step S915 to quickly transit to the operation state before the beginning of the disk unloading operation.

The operation executed when the user sets the value of the allowable initial operation skip time timer for disk access will be described below with reference to FIG. 10 which shows a UI (user interface) display upon setting an allowable initial operation skip time for disk access.

Figure 10:
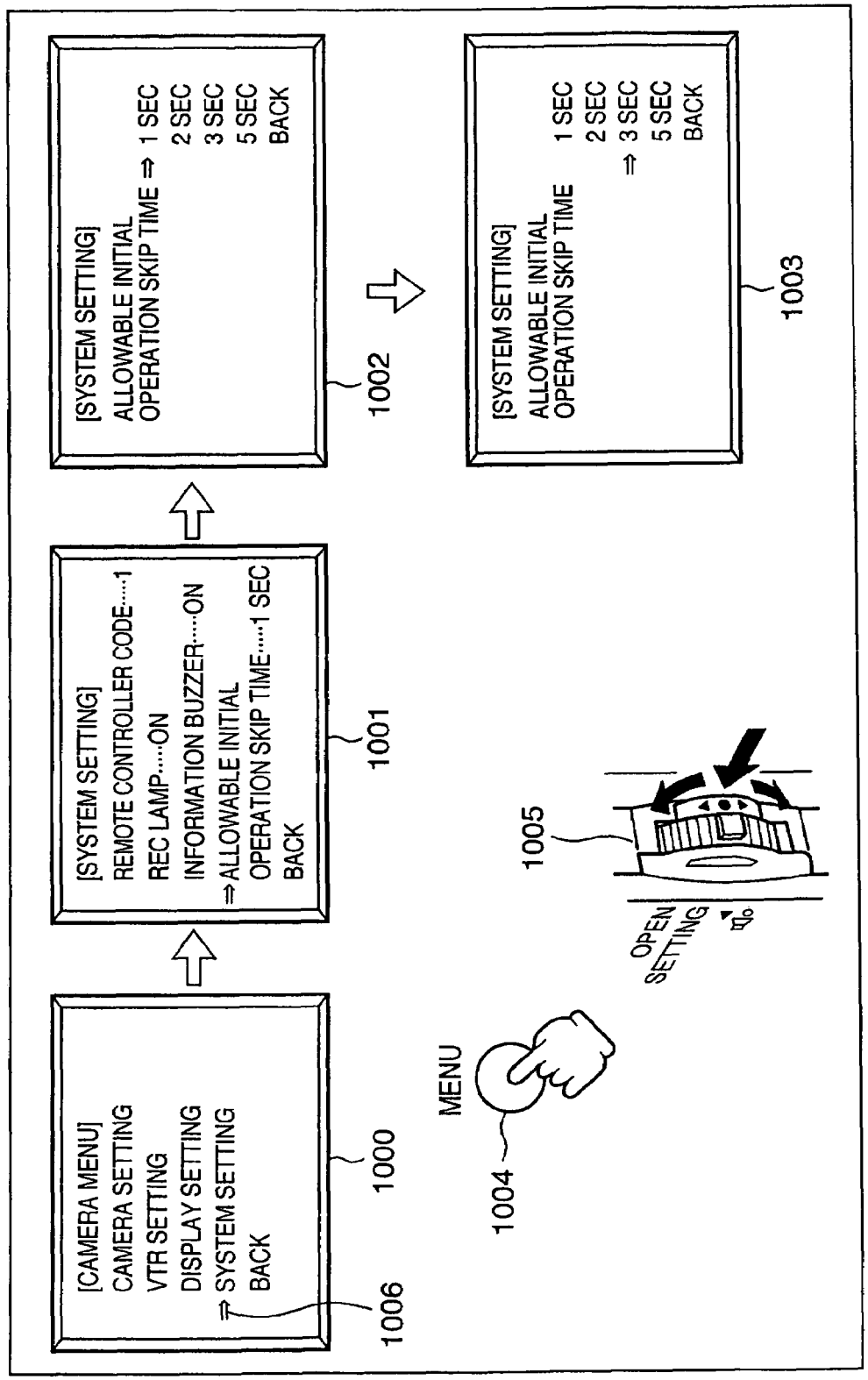
FIG. 10 shows an UI display example upon setting an allowable initial setting skip time for disk access.

The user presses the [MENU] SW of the operation unit 810 (see 1004 in FIG. 10) to launch [camera menu] (see 1000 in FIG. 10). The user moves a menu cursor 1006 by operating an [UP]/[DOWN] SW (see 1005 in FIG. 10) to select an item "system setting", and then presses a [SET] SW of the operation unit 810 (see 1005 in FIG. 10). Then, a [system setting] menu 1001 in FIG. 10 is displayed. On this menu, the user similarly operates the SW 1005 in FIG. 10 to select "allowable initial operation skip time". Then, an allowable initial operation skip time setting menu 1002 in FIG. 10 is displayed. In this case, since "1 sec" is selected as a default value, the user selects and sets a desired time (e.g., "3 sec" in this case) (see 1003 in FIG. 10) by operating the SW 1005 in FIG. 10 in the same manner as above.

Sixth Embodiment

In the sixth embodiment, a camera-integrated optical disk recording/playback apparatus has the same external arrangement as that in FIG. 1 that shows the first embodiment.

This embodiment will explain a case wherein the operation for skipping an initial operation for disk access as in the fifth embodiment is applied to the camera-integrated optical disk recording/playback apparatus shown in FIG. 1.

For confirmation, different parts from the fifth embodiment will be described below with reference to FIG. 1.

A disk (loading/unloading) detector 24 mechanically detects the presence/absence of disk loading/unloading in accordance with an instruction from the system controller 9, and transmits detection information to the system controller 9. A disk cover Open/Close detector 23 detects the state of a disk cover, and transmits it to the system controller 9.

The system controller 9 comprises a microcomputer that comprehensively controls various functions, a control program storage ROM, a work RAM for various kinds of processing, an I/O port, a timer counter, and the like. The system controller 9 controls the overall operation of the camera-integrated optical disk recording/playback apparatus, which includes the analog front end 6, disk signal processor 7, compression/decompression unit 14, external digital interface block 15, disk detector 24, and video/audio encoder 20, on the basis of a signal which is supplied from the operation unit 10 and corresponds to a user's instruction.

The operation of the disk detector 24 will be described in detail below with reference to FIGS. 12A to 12C which show operation images of a disk loading/unloading detection unit.

Reference numeral 1 denotes a disk; 1202, a turntable; and 1201, disk catching pawls which are vertically movable by a spring and the like, and fix the disk 1. Reference numeral 4 denotes a spindle motor which controls the rotation of the disk. These components are known, and a detailed description thereof will be omitted.

A mechanism that allows detection of disk loading/unloading will be described below.

Reference numeral 1210 denotes a detection actuator, which is attached to a base 1208 and is vertically movable by a lift mechanism 1209. The actuator 1210 comprises a disk detection member 1205, spring 1204, base 1207, and detection switch 1206, and these components are controlled by the system controller 9.

Figure 12A:
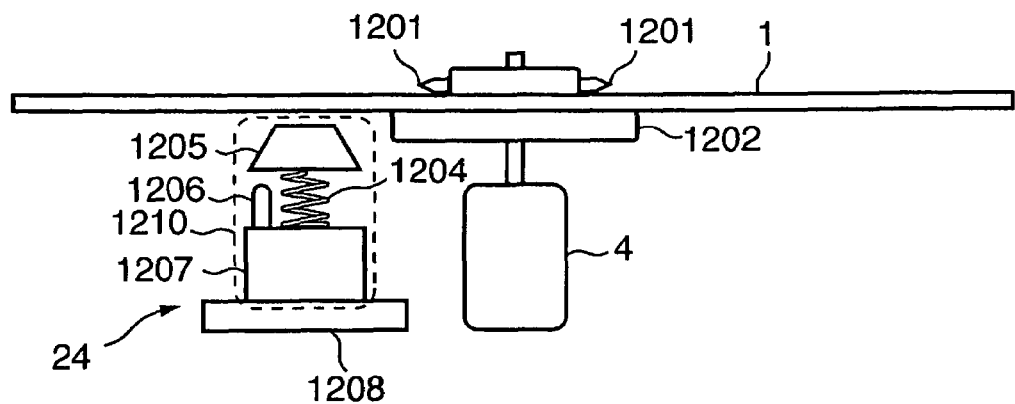
FIGS. 12A to 12C show operation images of a disk (loading/unloading) detection unit in the sixth embodiment.
Figure 12B:
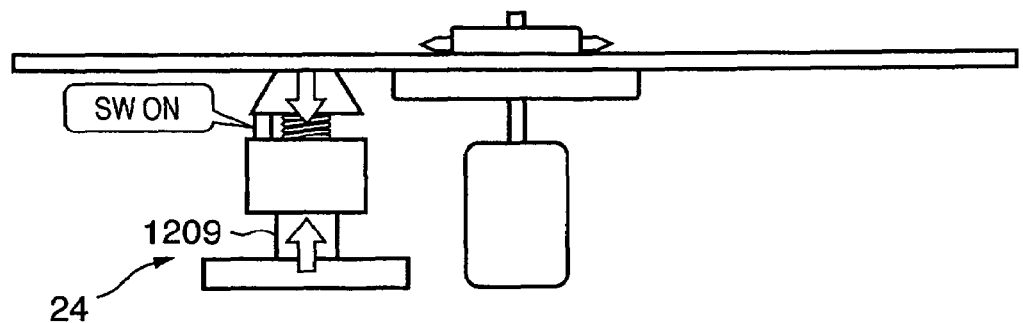
Figure 12C:
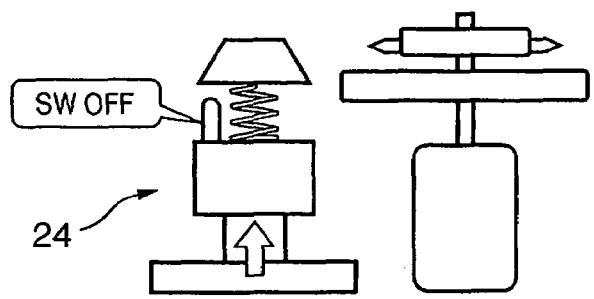

In a normal disk rotation state, the actuator 1210 is controlled to be located at its lower position and not to contact the disk (see FIG. 12A). When the disk 1 stops, the actuator 1210 is pushed up by the lift mechanism 1209. At this time, when the disk 1 is mounted, the disk detection member 1205 is pushed down to turn on the detection switch 1206 (see FIG. 12B). This information is sent to the system controller 9, which can detect loading of the disk 1. When no disk is mounted, the detection switch 1206 is not turned on (see FIG. 12C), thus detecting that no disk is mounted.

Figure 13:
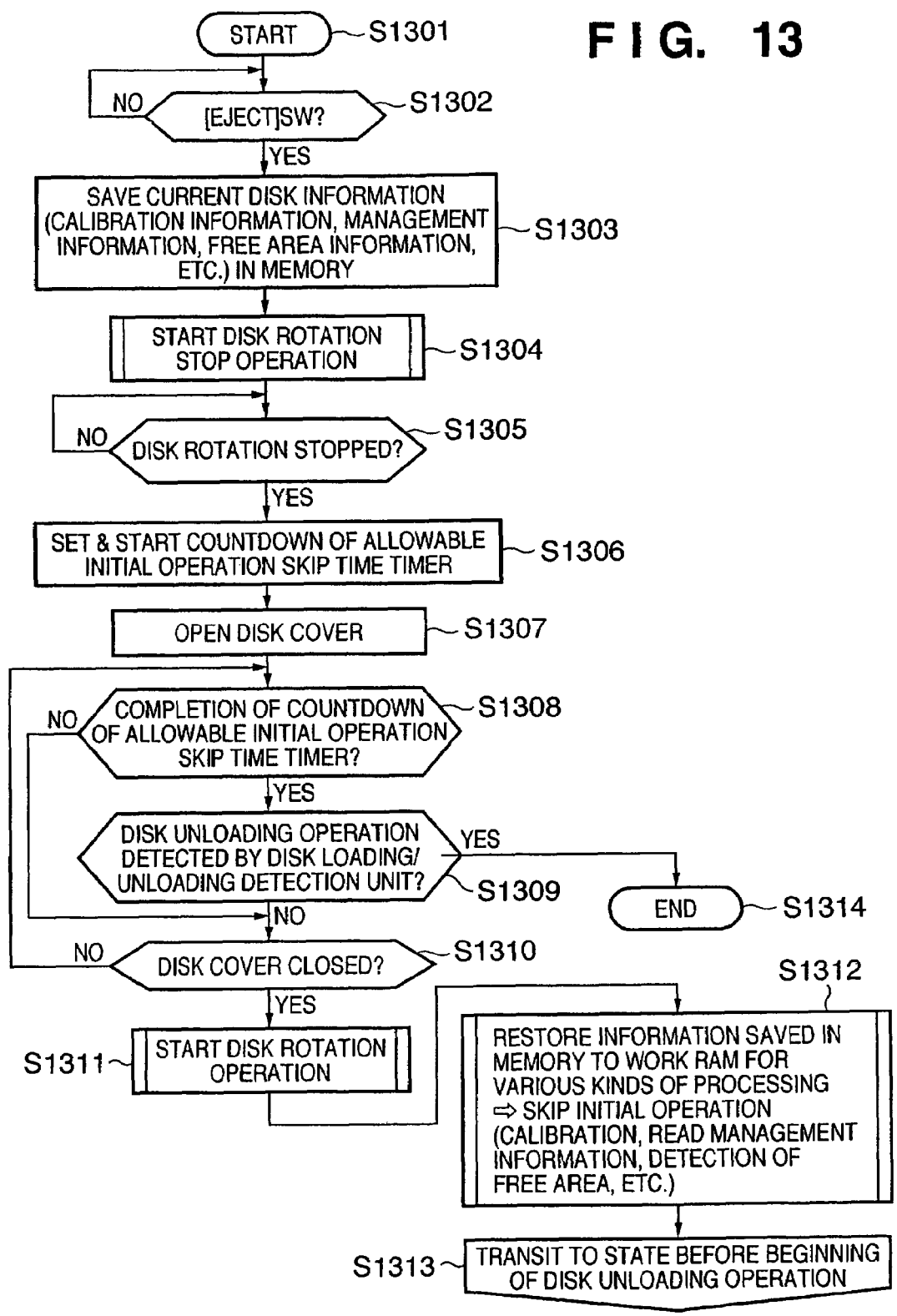
FIG. 13 is a flowchart showing an initial operation skip operation for disk access in the sixth embodiment.

The operation for skipping an initial operation for disk access in the camera-integrated optical disk recording/playback apparatus of this embodiment will be described below with reference to FIG. 13 that shows the flowchart of the initial operation skip operation for disk access, and FIG. 14 that shows a countdown display of an allowable initial operation skip time timer.

Figure 9:
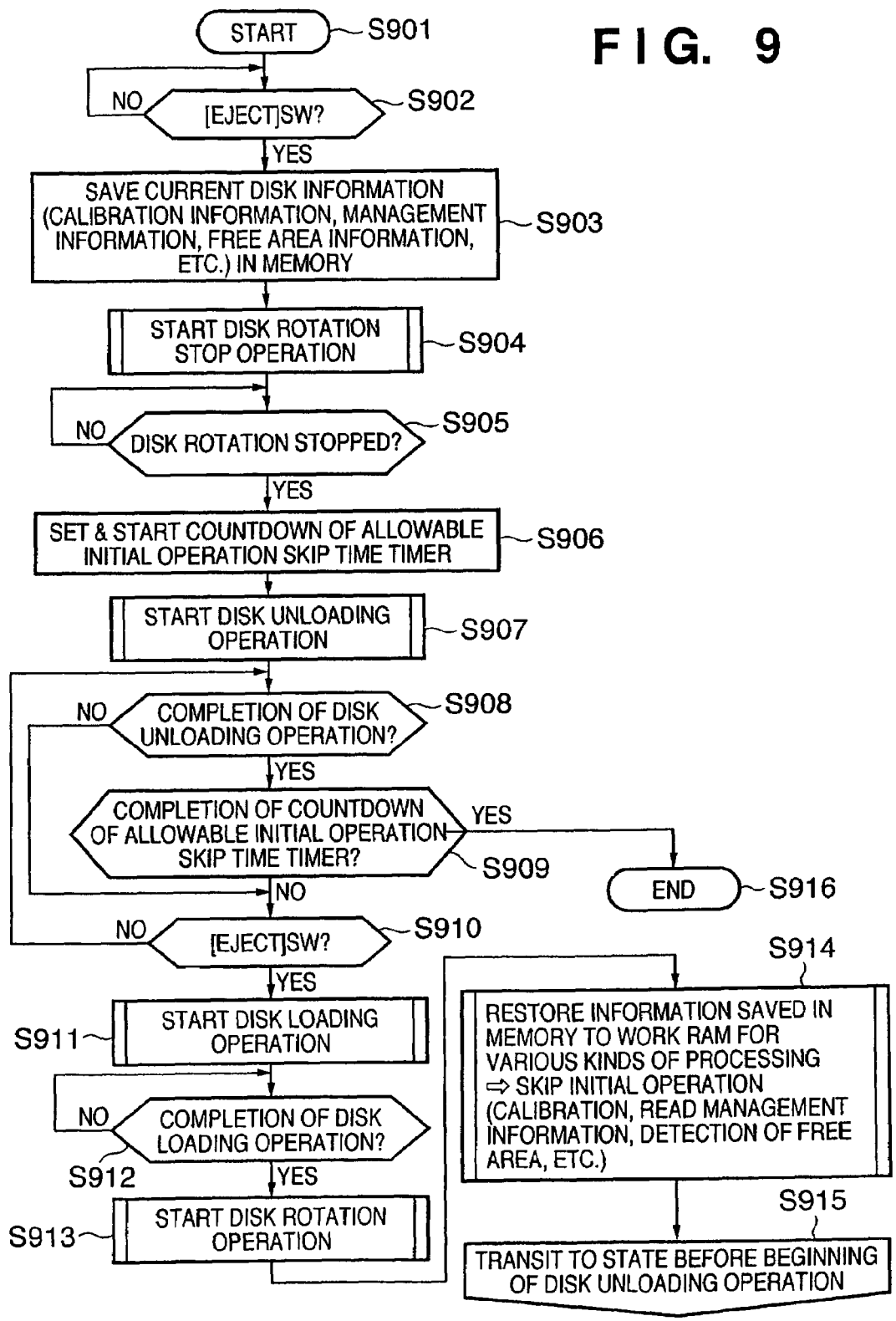
FIG. 9 is a flowchart showing an initial operation skip operation for disk access in the fifth embodiment.

Since steps S1302 to S1306 are the same as steps S902 to S906 in FIG. 9, and the operation that allows the user to set the value of the allowable initial operation skip time timer for disk access is the same as that in the fifth embodiment, a description thereof will be omitted.

In step S1307, a disk cover (not shown) is opened, and the flow advances to step S1308.

It is checked in step S1308 if the countdown operation of the allowable initial operation skip time timer is complete. If the countdown operation of the allowable initial operation skip time timer is complete, the flow branches to step S1309; otherwise, the flow branches to step S1310. The disk detector 24 detects in step S1309 if the disk is unloaded. If the disk is unloaded, the flow branches to step S1314 to completely end the disk unloading operation. If the disk is not unloaded, it is checked in step S1310 if the disk cover is closed. If the disk cover is closed, the flow branches to step S1311; otherwise, the flow returns to step S1308.

Figure 14:
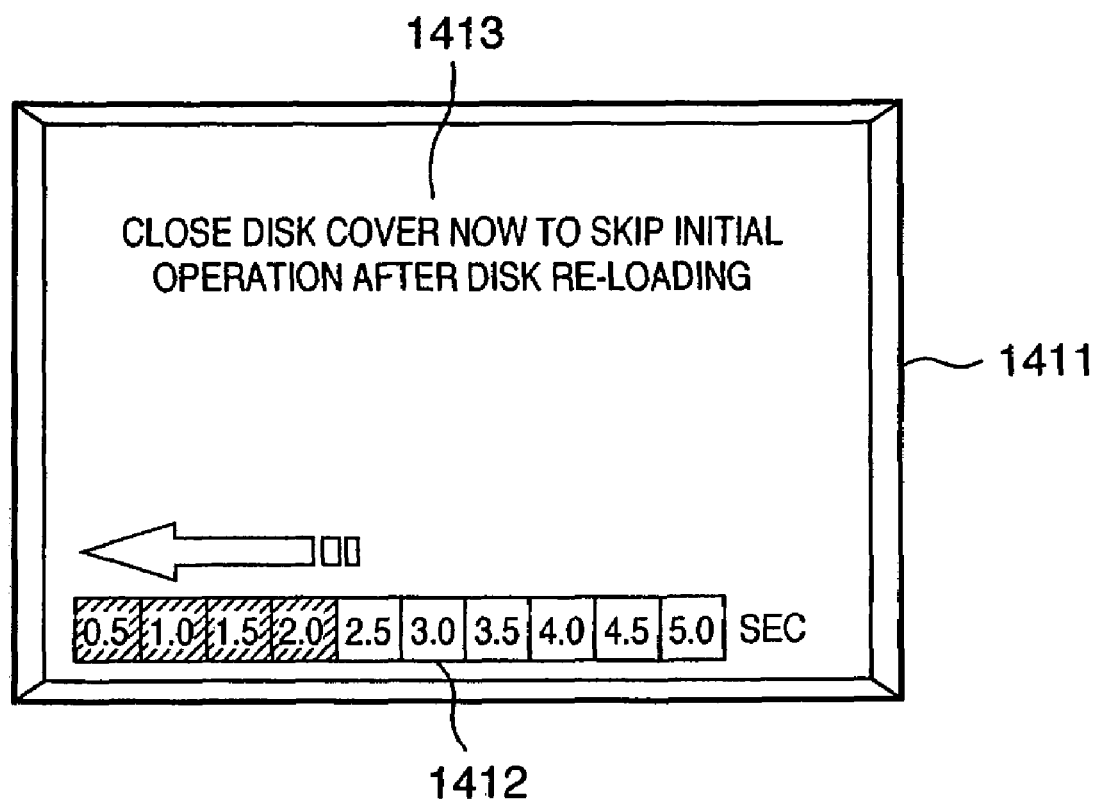
FIG. 14 shows a countdown display example of an allowable initial operation skip time timer in the sixth embodiment.

FIG. 14 shows an example of a display 1411 on the liquid crystal panel 19, which indicates the status of the countdown operation. In FIG. 14, numerals indicating times are displayed within a progress bar indicating the status of the countdown operation, and a "box" corresponding to the remaining time is highlighted (1412 in FIG. 14). Also, a message (e.g., 1413 in FIG. 14) is displayed to make the user easily understand the current status. Note that such display may or may not be made.

In step S1311, the disk rotation operation starts. In step S1312, the control information (the calibration information, management information, free area information, and the like) temporarily saved on the memory 26 in step S1303 is restored to the work RAM for various kinds of processing in the system controller 9, thus skipping some initial operations required for disk access. The flow then advances to step S1313 to quickly transit to the operation state before the beginning of the disk unloading operation.

As described above, according to the fifth and sixth embodiments, when a loading operation instruction is received again within a predetermined period of time after the beginning of the unloading operation, the loading operation starts, and the control information (the calibration information, management information, free area information, and the like) temporarily saved on the memory 826 is read out and restored to the work RAM for various kinds of processing in the system controller 809, thus skipping the initial operation for reading out the control information by accessing the disk after completion of the loading operation. Thus, an unexpected recording chance immediately after the beginning of the disk unloading operation can be caught. Also, recovery of the disk unloading operation due to an operation error can be quickly done.

Furthermore, if the disk cover is closed again within a predetermined period of time after the disk cover is completely opened, the control information (the calibration information, management information, free area information, and the like) temporarily saved on the memory 26 is read out and restored to the work RAM for various kinds of processing in the system controller 9, thus skipping the initial operation for reading out the control information by accessing the disk after completion of disk attachment. Thus, an unexpected recording chance immediately after the beginning of the disk unloading operation can be caught. Also, recovery of the disk unloading operation due to an operation error can be quickly done.

Also, since the user can set the predetermined time to be counted, the initial operation can be prevented from being skipped by mistake.

Since the count status is displayed, when the loading operation instruction is issued after the beginning of the unloading operation or when the disk cover is closed after it is opened, it can be easily checked if the initial operation is skipped.

Moreover, when the loading operation instruction is received before completion of the unloading operation, since the loading operation can start, it is surely determined that no disk exchange is made, and the initial operation for accessing the disk after completion of the loading operation can be skipped.

In addition, when the disk cover is closed before a change in disk loading/unloading state is detected, it is surely determined that no disk exchange is made, and the initial operation for accessing the disk can be skipped. Other effects expected by skipping the initial operation are as described above.

Other Embodiments

The objects of the respective embodiments are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the aforementioned sequences.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application No. 2004-282346 filed on Sep. 28, 2004 and Japanese Patent Application No. 2004-326460 filed on Nov. 10, 2004, the entire contents of which are hereby incorporated by reference herein.

The invention claimed is:

1. A recording apparatus comprising:
a load and eject unit for loading and ejecting a disk recording medium;
a writing and reading unit for writing information data in the disk recording medium loaded by the load and eject unit and for reading information data from the disk recording medium, the writing and reading unit reading a management information from the disk recording medium and storing the read management information in a memory in accordance with a loading operation of the disk recording medium;
an instruction receiving unit; and
a control unit for controlling the writing and reading unit so as to perform an eject preparation operation including an operation for writing the management information stored in the memory in the disk recording medium and controlling the load and eject unit so as to eject the disk recording medium after completion of the eject preparation operation by the writing and reading unit in accordance with an eject instruction received by the instruction receiving unit,
wherein the control unit controls the writing and reading unit, if an eject cancel instruction is received by the instruction receiving device during the eject preparation operation, so as to stop performing the eject preparation operation and stops an eject operation of the disk recording medium by the load and eject unit.

2. An apparatus according to claim 1, further comprising:
a notification unit for notifying a message indicating that the eject cancel instruction is valid in accordance with the eject instruction.

3. An apparatus according to claim 1, wherein the writing and reading unit updating the management information stored in the memory in accordance with a writing operation of the information data, and wherein the control unit inhibits a reading operation of the management information from the disk recording medium by the writing and reading unit if the eject cancel instruction is received by the instruction receiving unit during the eject preparation operation.

4. An apparatus according to claim 1, wherein:
the writing and reading unit comprises a light beam unit for irradiating the disk recording medium with a light beam, adjusting power of the light beam in response to loading of the disk recording medium, and storing an optimum value of the power of the light beam in the memory, and;
wherein the control unit inhibits a power adjusting operation by the writing and reading unit if the eject cancel instruction is received by the instruction receiving unit during the eject preparation operation.

5. A recording apparatus comprising:
a load and eject unit for loading and ejecting a disk recording medium;
a writing and reading unit for writing information data in the disk recording medium loaded by the load and eject unit and for reading information data from the disk recording medium, the writing and reading unit reading a management information from the disk recording medium and storing the read management information in a memory in accordance with a loading operation of the disk recording medium;
an instruction receiving unit;
a control unit for controlling the load and eject unit in accordance with an eject instruction received by the instruction receiving unit so as to eject the disk recording medium,
wherein the control unit controls the writing and reading unit so as not to read the management information from the disk recording medium if the disk recording medium is set in a load state by the load and eject unit within a predetermined period of time after the disk recording medium is set in an eject state by the load and eject unit, and
wherein the control unit controls the writing and reading unit so as to read the management information from the disk recording medium if the disk recording medium is set in a load state by the load and eject unit after the predetermined period of time elapsed after the disk recording medium is set in an eject state by the load and eject unit.

6. The apparatus according to claim 5, wherein said load/eject device comprises a tray for mounting the disk recording medium, and an instruction device for issuing an instruction to move said tray to a position where the disk recording medium is loaded to said apparatus and a position where the disk recording medium is ejected from said apparatus.

7. A recording apparatus comprising:
a load and eject unit for loading and ejecting an optical disk
a writing and reading unit for writing information data in the optical disk loaded by the load and eject unit and for reading information data from the optical disk, the writing and reading unit including a light beam unit for irradiating the optical disk with a light beam, adjusting a power of the light beam in response to a loading operation of the optical disk, and storing an optimum value of the power of the light beam in a memory;
an instruction receiving unit;
a control unit for controlling the load and eject unit in accordance with an eject instruction received by the instruction receiving unit so as to eject the optical disk,
wherein the control unit controls the writing and reading unit so as to prohibit the adjusting operation of the power of the light beam if the optical disk is set in a load state by the load and eject unit within a predetermined period of time after the optical disk is set in an eject state by the load and eject unit, and
wherein the control unit controls the writing and reading unit so as to perform the adjusting operation of the power of the light beam if the optical disk is set in a load state by the load and eject unit after the predetermined period of time elapsed after the optical disk is set in an eject state by the load and eject unit.

8. A reading apparatus comprising:
a load and eject unit for loading and ejecting the disk recording medium;
a reading unit for reading information data from the disk recording medium loaded by the load and eject unit, the reading unit reading a management information from the disk recording medium and storing the read management information in a memory in accordance with a loading operation of the disk recording medium;
an instruction receiving unit;
a control unit for controlling the load and eject unit in accordance with an eject instruction received by the instruction receiving unit so as to eject the disk recording medium,
wherein the control unit controls the reading unit so as to prohibit a reading operation of the management information from the disk recording medium if the disk recording medium is set in a load state by the load and eject unit within a predetermined period of time after the disk recording medium is set in an eject state by the load and eject unit, and
wherein the control unit controls the reading unit so as to perform the reading operation of the management information from the disk recording medium and to store the management information in the memory if the disk recording medium is set in a load state by the load and eject unit after the predetermined period of time elapsed after the disk recording medium is set in an eject state by the load and eject unit.

* * * * *